(12) United States Patent
Shah et al.

(10) Patent No.: US 11,070,377 B1
(45) Date of Patent: Jul. 20, 2021

(54) BLENDED VIRTUAL MACHINE APPROACH FOR FLEXIBLE PRODUCTION DELIVERY OF INTELLIGENT BUSINESS WORKFLOW RULES

(71) Applicant: Bank of America Corporation, Charlotte, NC (US)

(72) Inventors: Nishant H. Shah, Indian Land, SC (US); Donatus Asumu, Plano, TX (US); Maruthi Shanmugam, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 344 days.

(21) Appl. No.: 16/275,473

(22) Filed: Feb. 14, 2019

(51) Int. Cl.
*H04L 9/32* (2006.01)
*H04L 9/14* (2006.01)
(Continued)

(52) U.S. Cl.
CPC .............. *H04L 9/3242* (2013.01); *G06F 8/40* (2013.01); *H04L 9/14* (2013.01); *G06F 8/30* (2013.01);
(Continued)

(58) Field of Classification Search
CPC . H04L 9/32; H04L 9/3242; H04L 9/14; H04L 9/0643; H04L 9/3239;
(Continued)

(56) References Cited

U.S. PATENT DOCUMENTS

| | | | | |
|---|---|---|---|---|
| 6,901,591 | B1* | 5/2005 | Sokolov | G06F 9/449 718/1 |
| 2002/0169999 | A1* | 11/2002 | Bhansali | G06F 8/427 714/26 |

(Continued)

FOREIGN PATENT DOCUMENTS

CN 102122280 A * 7/2011 ............. G06F 17/27

OTHER PUBLICATIONS

A methodology and tool support for managing business rules in organisations by Marko Bajec and Marjan Krisper pp. 21; (Year: 2004).*

(Continued)

*Primary Examiner* — Samson B Lemma
*Assistant Examiner* — Ali H. Cheema
(74) *Attorney, Agent, or Firm* — Weiss & Arons LLP; Michael A. Springs, Esq.

(57) ABSTRACT

A method for blending uncompiled source files and compiled binaries in a single Runtime container. The method may include receiving data at a configuration database. The method may include invoking a scheduler. The method may include determining whether it is time to rerun the software code referenced by the Runtime container. The method may include performing a hash function on source files comprising content and logic. The method may include retrieving source files that include updated hash signatures. The method may include storing an in-memory equivalent of the source files. The method may include invoking a class loader for each source file that has been parsed successfully. The (Continued)

Blended Frequency Deployment Model

H1 • • H6 : High Frequency Interpreted Source Deployment
L1 • • L3 : Low Frequency Compiled Binary Deployment method may include storing, for each successfully loaded source file, a name and reference location. The method may include loading classes based on received names. The method may include compiling the binaries and implementing the logic referenced by the received names.

16 Claims, 3 Drawing Sheets

(51) Int. Cl.
*G06F 8/40* (2018.01)
*G06F 8/30* (2018.01)
*G06F 9/46* (2006.01)
*G06Q 30/04* (2012.01)
*G06Q 20/38* (2012.01)
*G06Q 20/22* (2012.01)
*H04L 9/06* (2006.01)
*G06F 9/448* (2018.01)

(52) U.S. Cl.
CPC .............. *G06F 9/449* (2018.02); *G06F 9/465* (2013.01); *G06Q 20/29* (2013.01); *G06Q 20/382* (2013.01); *G06Q 30/04* (2013.01); *H04L 9/0643* (2013.01); *H04L 9/3239* (2013.01)

(58) Field of Classification Search
CPC . H04L 9/3236; G06F 8/40; G06F 8/30; G06F 8/41; G06F 8/70; G06F 8/427; G06F 8/437; G06F 9/449; G06F 9/4494; G06F 9/45504; G06F 9/45508; G06F 9/45512; G06F 9/465; G06F 9/5066; G06F 9/44; G06F 9/4488; G06F 9/44563; G06F 9/44589; G06F 9/4516; G06Q 20/29; G06Q 20/382; G06Q 30/04; G06Q 2220/00

USPC ......... 713/189; 717/107, 121, 166, 104, 148
See application file for complete search history.

(56) References Cited

U.S. PATENT DOCUMENTS

| | | | | |
|---|---|---|---|---|
| 2006/0190923 | A1* | 8/2006 | Jubran | G06F 9/44589 717/104 |
| 2007/0061798 | A1* | 3/2007 | Atsatt | G06F 9/44563 717/166 |
| 2008/0101768 | A1* | 5/2008 | Smith | H04N 5/782 386/239 |
| 2008/0134207 | A1* | 6/2008 | Chamieh | G06F 9/4488 719/315 |
| 2012/0204162 | A1* | 8/2012 | Nikara | G06F 9/45516 717/148 |
| 2013/0139164 | A1* | 5/2013 | Balko | G06F 8/41 718/102 |
| 2013/0219361 | A1* | 8/2013 | Fiebig | G06F 9/44 717/121 |
| 2014/0096107 | A1* | 4/2014 | Ravel | G06F 8/70 717/107 |
| 2015/0317325 | A1* | 11/2015 | Key | G06F 16/152 707/770 |
| 2016/0132369 | A1* | 5/2016 | Lee | G06F 9/5094 713/2 |
| 2018/0091484 | A1* | 3/2018 | Atta | H04L 9/3247 |
| 2019/0317879 | A1* | 10/2019 | McCormick | G06F 11/3664 |
| 2020/0104236 | A1* | 4/2020 | Creel | G06F 11/3612 |
| 2021/0096834 | A1* | 4/2021 | Goetz | G06F 8/437 |

OTHER PUBLICATIONS

Extracting Business Logic from Business Process Models by Olga Levina, Oliver Holschke and Jannis Rake-Revelant pp. 5; IEEE publication date (Year: 2010).*

* cited by examiner

BLENDED VIRTUAL MACHINE APPROACH FOR FLEXIBLE PRODUCTION DELIVERY OF INTELLIGENT BUSINESS WORKFLOW RULES

FIELD OF TECHNOLOGY

This disclosure relates to software delivery. Specifically, this disclosure relates to deploying software received from multiple sources.

BACKGROUND

A software module proceeds through multiple stages during a software development life cycle. Illustrative stages include a development stage, a testing stage, a packaging stage, a delivery stage and a deployment stage. Conventionally, during the delivery stage, the packaged module is transmitted to a production environment. The packaged software module, or compiled binaries, received at the production environment, are typically ready for deployment. The compiled binaries are then executed from a production container at Runtime.

Compiled binary files are usually delivered to the production container on a release schedule. Normal releases are scheduled with eight-to-twelve-week intervals between releases.

The compiled binary files may include business rules expressed in workflows. Business rules may encapsulate relationships between an entity owning the binary files and their customers, assets of their customers, experiences of their customers, and delivery channels used to interact with their customers.

These business rules change frequently, many times undergoing multiple changes within a day or week. For example, a particular customer might have specific characteristics, and therefore, request or deserve certain privileges. These privileges may change more frequently than the eight-to-twelve-week production release interval. There may be a need to upgrade this customer's experience in a rapid fashion.

Because of timing of the predefined release schedule, updates are only incorporated into the production environment during a scheduled release. Therefore, the production environment may not be adapted to include the most recent business rule changes.

There have been suggestions to shorten the intervals between releases. However, shortened intervals have been shown to cause additional mistakes and require a considerably greater amount of resources than conventional intervals.

It would be desirable, therefore, to implement a system that maintains a typical release schedule and supports capabilities to receive spontaneous, on-demand updates.

SUMMARY OF THE DISCLOSURE

A system for blending uncompiled source files with compiled binaries in a Runtime container is provided. Runtime may refer to execution time. Runtime may also refer to the time when a software element is in operation.

The uncompiled source files may be received at a greater than threshold frequency. The compiled binaries may be received at a lower than threshold frequency.

The system may include a configuration database. The configuration database may include data. The data may relate to, and/or interact with, a scheduler. The data may define a mount point. The system may include the scheduler. The system may include the mount point. The mount point may further define the storage location of a business rules source tree. The business rules source tree may include content source files and logic source files.

The system may include a cryptographic hash function module, a parser, a cache memory, a class loader, a HashMap, a Runtime executor and/or a Runtime container.

A HashMap may define a software collection class. The HashMap may be used for storing key and value pairs.

The scheduler may be invoked by the configuration database. The scheduler may determine if a current time is a refresh time. A refresh time may be established after a predetermined time period has elapsed from a previous refresh time. The predetermined time period may be 1 minute, 10 minutes, 30 minutes, 1 hour, 24 hours, 36 hours, 5 days, 1 week, 2 weeks or any other suitable time period.

The cryptographic hash function module may execute a cryptographic hash function on each content source file and logic source file included in the business rules source tree. The cryptographic hash function module may generate a hash digest for each content source file and logic source file. The cryptographic hash function module may compare, for each content source file and logic source file, the generated hash digest to a stored hash digest. Each content source file and/or logic source file in which the generated hash digest does not match the corresponding stored hash digest may be copied from the mount point into cache memory.

The parser may examine the copied source files for semantic and syntactic errors. The parser may identify the copied source files that are free of semantic and syntactic errors. Source files that are free of semantic and syntactic errors may be source files that do not contain semantic or syntactic errors. The parser may invoke the class loader upon identification of one or more copied source files that are free of semantic and syntactic errors.

The class loader may create a class instance for each loaded source file that has been identified to be free of semantic and syntactic errors. The class instances may be ingestible by the Runtime container.

A HashMap may be a software collection class. The HashMap may store key and value pairs. A key may be used to identify data stored as a value.

The HashMap may store the relationship of each created class instance and the corresponding name of the identified loaded source file. The HashMap may also store a reference to a storage location of the class instance. Each name of each identified loaded source file may be included in the HashMap as a key. Each reference to each location of a class instance may be included in the HashMap as a value.

The Runtime executor may receive a file name with which to load a corresponding class. The Runtime executor may transmit the file name to the HashMap. The Runtime executor may retrieve the corresponding reference. The Runtime executor may retrieve the class located in a location identified by the reference. The Runtime container may receive the compiled binaries. The Runtime container may process the compiled binaries with the retrieved corresponding class.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
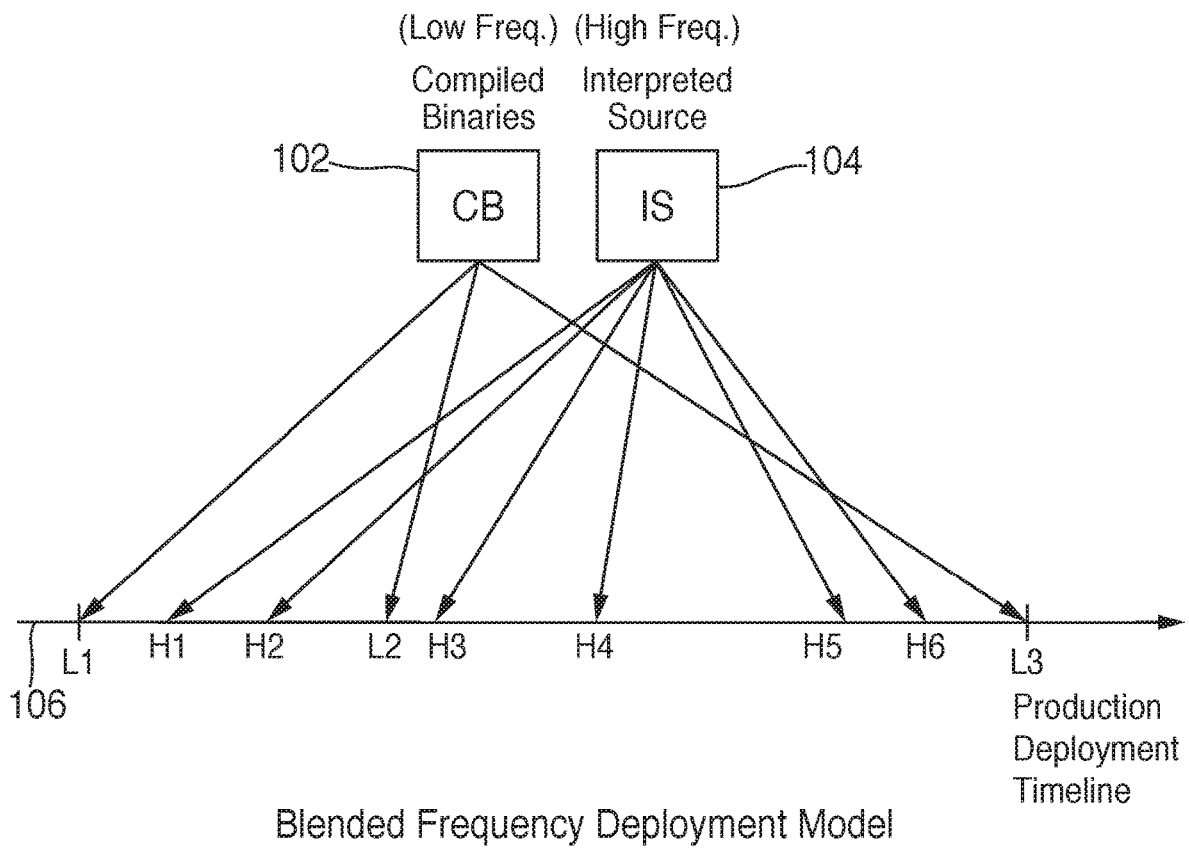
FIG. 1 shows an illustrative diagram in accordance with principles of the invention.

A system for blending uncompiled source files with compiled binaries is provided. The uncompiled source files may be received at a predetermined high frequency, or at a frequency higher than a frequency threshold. The uncompiled source files may be received at a variable high frequency. An exemplary high frequency may be, for example, minutes or days. The compiled binaries, or compiled source files, may be received at a predetermined low frequency, or at a frequency lower than a frequency threshold. An exemplary low frequency may be, for example, weeks or months.

It should be appreciated that the threshold may be configurable. For example, the threshold may be set to five minutes. The source files that are updated at a higher frequency than five minutes may be considered to be transmitted at a high frequency, and source files that are transmitted at a lower frequency than five minutes may be considered to be transmitted at a low frequency. As such, the threshold may be set to any amount of time, including nanoseconds, seconds, minutes, hours, days, months or years. While a configurable threshold can be set, the actual frequency of a refresh may be determined by actual changes being detected in the source files.

The system may include a configuration database. The configuration database may be a repository for substantially all configured elements of the system. The configuration database may include data. The data may include storage location information of source code (compiled and/or uncompiled). The data may include one or more specified mount points from which the source code will be copied. The data may include interval information, such as the time span between each source code delivery. The time span information may inform the system the amount of time to wait before the system attempts to refresh.

The system may include a scheduler. The scheduler may be invoked by the configuration database. The scheduler may determine if the current time is a refresh time. A refresh time may be established after a predetermined amount of time has elapsed from a previous refresh time. The scheduler may receive current time information from a clock. The scheduler may communicate with the configuration database. The scheduler may request data from the configuration database relating to the most recent update, current time information and/or interval information. In some embodiments, the scheduler may maintain data relating to the most recent update, current time information and/or interval information.

The system may include a mount point. The mount point may be the storage location of a business rules source tree. The business rules source tree may include the source files. The source files may be a collection of content source files and logic source files. The mount point may be the location from which the source files are retrieved in order to be processed by the system. In the event that the mount point information is outdated, includes a mistake, or is otherwise faulty, the files retrieved may be incorrect and/or the process may be unable to proceed properly. Therefore, the accuracy of the mount point may be significant for the health of the system.

The system may include a cryptographic hash function module. The module may execute a cryptographic hash function on each content source file and logic source file included in the business rules source tree. The module may generate a hash digest for each content source file and/or logic source file included in the business rules source tree. The module may, for each content source file and/or logic source file, compare the generated hash digest to a stored hash digest. The module may load the file from the mount point to a cache memory, for each content source file and/or logic source file in which the corresponding generated hash digest does not match the corresponding stored hash digest.

The system may include a parser. The parser may examine the loaded source files for semantic and/or syntactic errors. Semantic errors may be errors relating to the meaning assigned to symbols, characters and words included in software code. Syntactic errors may be errors occurring from the structure/form of the software code specified by a programming language. The parser may identify the loaded source files that are free of semantic and syntactic errors.

The system may include a class loader. The class loader may be invoked. The class loader may create a class instance for each identified loaded source file. The class instance may be ingestible by the Runtime container.

The system may include a HashMap. A HashMap may be a map-based collection that is used to store key and value pairs. The key and corresponding value may be related. The key may be used to identify the value. In order to retrieve a value, the corresponding key may be passed to the HashMap.

A reference to each class instance may be stored as a value in the HashMap. The reference may point to the storage location of the class instance. The corresponding key may be the name of the identified loaded source file. Therefore, the HashMap may store the relationship of each class instance and the identified source file.

The system may include a Runtime executor. The Runtime executor may be located within the Runtime container. The Runtime executor may receive an instruction to load a class instance. The instruction may include a file name. The file name may correspond to a business rule. In some instances, receipt of a file name may be considered by the Runtime executor as an instruction to load the class instance that corresponds to the file name. Upon receipt of the instruction, the Runtime executor may transmit the file name to the HashMap, and retrieve a corresponding reference location.

Because the Runtime executor may be located within the Runtime container, upon receipt of the corresponding reference location at the Runtime executor, the Runtime container may retrieve the class from the storage location referenced by the reference location.

The Runtime container may also receive the compiled binaries. The Runtime container may process the retrieved class, or plurality of classes, together with the compiled binaries. In some instances, the compiled binaries may reference a business rule, or file name associated with a business rule, included in the HashMap. In these instances, the Runtime container may interpolate the retrieved class into the compiled binaries in order to execute blended source files.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative blended frequency deployment model. The model may display receipt of high frequency interpreted source and low frequency compiled binaries for deployment.

Compiled binaries 102, received at a low frequency, and interpreted source files 104, received at a high frequency may be combined in a single environment or system. Timeline 106 shows an example of receipt of compiled binaries and interpreted source files at the environment or system.

There are two sets of artifacts included in the model. The first set of artifacts may be compiled binaries 102. Compiled binaries 102 may be written in source code and compiled into class files. The class files may be packaged into artifacts such as web archives or enterprise archives. The web and/or enterprise archives may be delivered to a production container. The production container executes the web and/or enterprise archives, or packaged binaries, at Runtime.

The compiled binaries generation and delivery process may be a low frequency delivery mechanism. The low frequency delivery mechanism may execute at set intervals. These low frequency deliveries may be shown on timeline 106 at L1, L2 and L3.

The second set of artifacts included in the model may be interpreted source files 104. Interpreted source files 104 may be generated for on-demand updates. These updates may be used when there is a change in business logic or business rules. Business rules may be expressed in workflows. These workflows have the capability to invoke logical elements, included in class instances, in order to provide on-demand high frequency updates. The high frequency updates, shown at H1, H2, H3, H4, H5 and H6, may remain source code until later in the blending process.

It should be appreciated that the business rules, which may include embedded logic and data, may, within an amount of time shorter than the low frequency interval, include a new or updated customer experience as an outcome of the high frequency updates. Additionally, the H line and the L line remain distinct throughout the blending process. The low frequency compiled binaries and the high frequency source files may be executed from the same Runtime container but remain separate and distinct code elements throughout the blending process.

Figure 2:
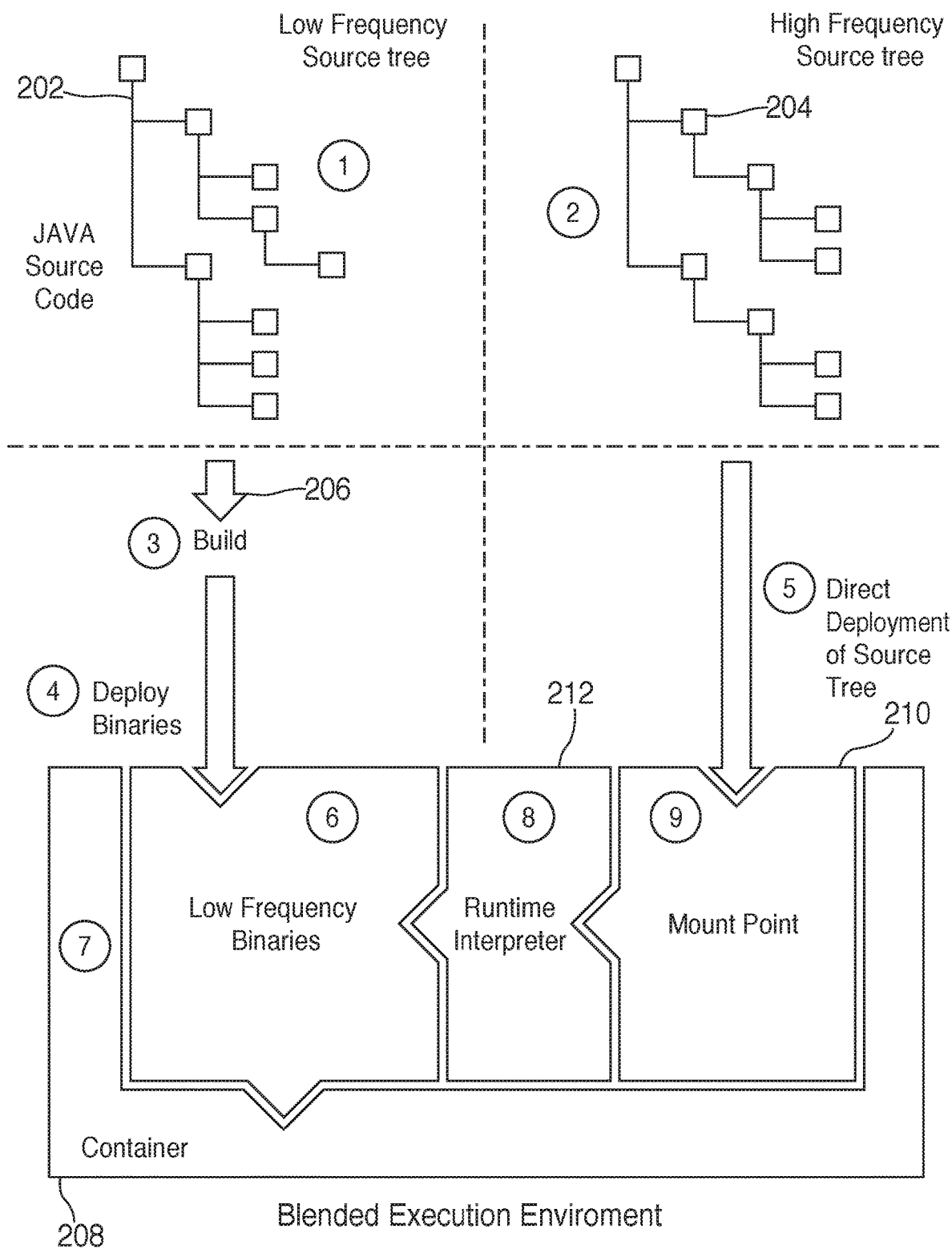
FIG. 2 shows another illustrative diagram in accordance with principles of the invention.

FIG. 2 shows an illustrative high-level diagram of an execution environment. Source tree 202 is shown at step 1. Source tree 202 may include a set of files and direct leaves that contain folders containing files. Source tree 202 may be written using Java® source code.

Source tree 204 is shown at step 2. Source tree 204 may include a set of files and direct leaves that contain fold-outs containing files. Source tree 204 may be written using the Groovy™ programming language by The Apache Software Foundation®. The Groovy™ programming language may have some syntactic differences to the Java programming language. The Groovy™ programming language may be semantically identical to the Java programming language. It should be appreciated that Groovy™ software need not be compiled before the logic is processed.

Source tree 202 may be compiled during build process 206. During build process 206, the system may construct and package a single unit of deployment that can be deployed in a production environment. The packaged unit of deployment, shown at step 6, may be plugged into container 208, shown at step 7.

Source tree 204 may be directly deployed, as shown at step 5, to mount point 210, as shown at step 9. Mount point 210 holds the uncompiled source files included in source tree 204. Source tree 204 may not be compiled when deployed to mount point 210. Mount point 210 may be used specifically because source tree 204 remains uncompiled.

Runtime interpreter 212 may be shown at step 8. Runtime interpreter may be an instance of software code that has the capability to read software code during the running of a program without interrupting the run, and translate the software code into binary form. The translation of software code into binary form may occur late in the process.

There may be substantially no point of connection between low frequency compiled binaries, shown at step 6, and the uncompiled source files at mount point 9. The uncompiled source files may not correspond to a scheduled release, and may be made available for use together with low frequency compiled binaries, shown at step 6.

The source code may be executed from Runtime container 208. The Java source code and the Groovy™ source code may remain separate and distinct, yet both sets of source code may be executed together within Runtime container 208. The compiled Java source code may be executed in tandem with the changed, updated or new logic of the Groovy™ source code.

Figure 3:
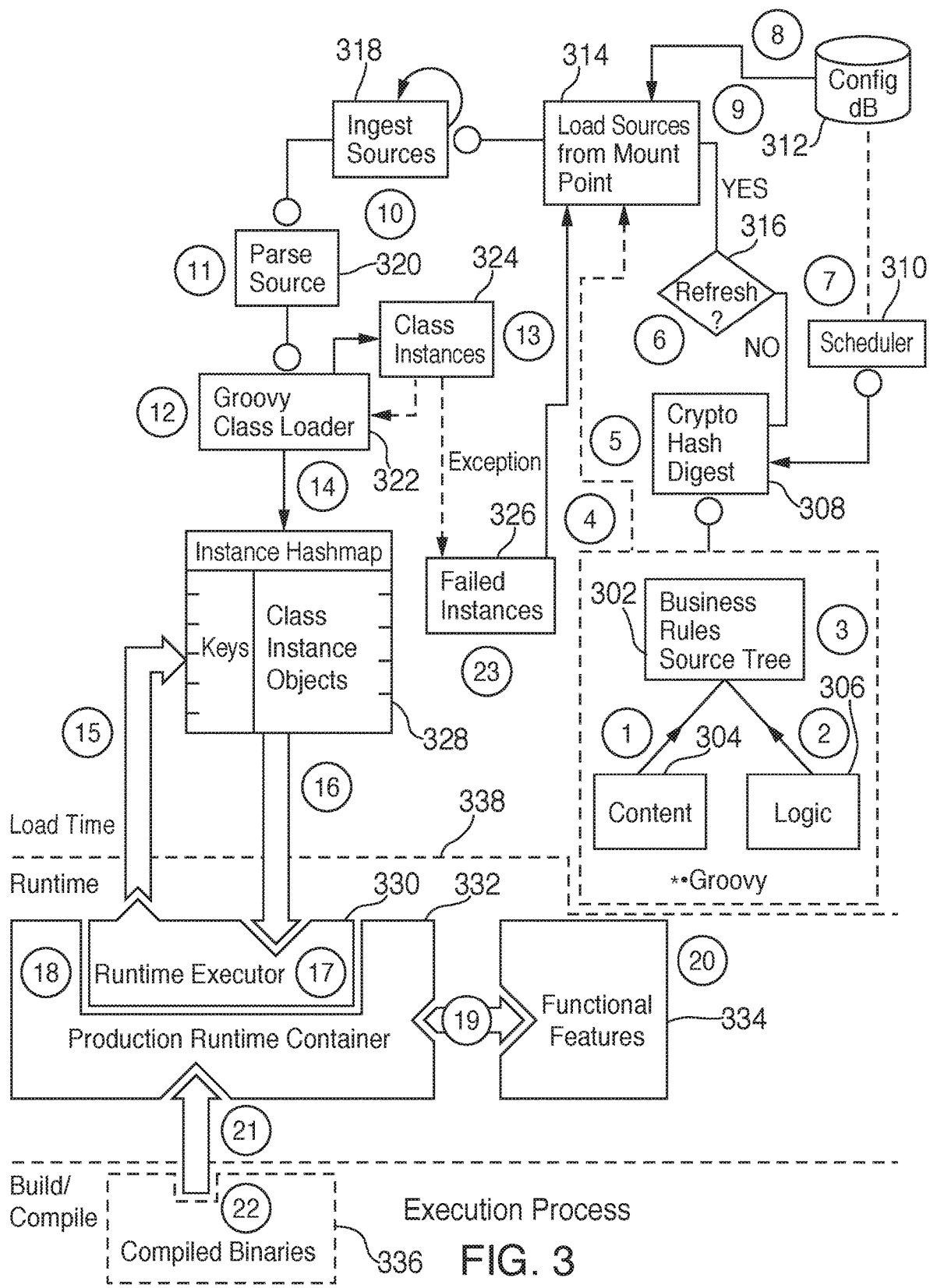
FIG. 3 shows yet another illustrative diagram in accordance with principles of the invention.

FIG. 3 shows an illustrative detailed execution process/system diagram. The diagram may include configuration database 312. Configuration database 312 may be a repository for substantially all configured elements included in the system. The configured elements may include scheduler 310, a specified mount point, the interval between delivery and any other suitable configured elements.

Configuration database 312 may communicate with scheduler 310. Configuration database 312, or another suitable system element, may invoke scheduler 310. Scheduler 310 may determine whether it is time to refresh the system, as shown at 316. When scheduler 310 determines that the system is ready to refresh, a cryptographic hash function may be performed on business rules source tree 302. Business rules source tree 302 may include content 304 and logic 306. In some embodiments, the cryptographic hash function may be executed on each individual content file and/or logic file.

The cryptographic hash digest, or digests (in the embodiment that hashes each file), generated by the cryptographic hash function module may be compared to stored cryptographic hash digest(s). The stored cryptographic hash digest(s) may have been generated by the cryptographic hash function module at a time prior to a current time. The generated digest(s) may be compared to the stored digest(s). When a significant change has occurred to a file included in source tree 302, the generated hash digest(s) and the stored hash digest(s) will be different. It should be appreciated that a significant change may include a change in content, logic or file structure. In some embodiments, timestamps associated with files may not be considered significant changes, and therefore, may not be shown in a hash digest comparison. An update trigger may be triggered upon determination of a difference between two hash digests.

Upon receipt of the update trigger, the system may determine whether the mount point of business rules source tree 302 has remained the same. In the event that the mount point has remained the same, source tree 302 may be loaded, as shown at 314. In the event that the mount point has changed, it may be necessary to update mount point data included in configuration database 312, prior to loading source tree 302.

Process ingest sources 318 may iterate through the list of inconsistent hash digests, which may indicate the list of significant changes that occurred within source tree 302. The updated source files, indicated by the list of inconsistent hash digests, may be ingested and stored in a cache memory. In other words, the system may store an in-memory equivalent of the source files that include a significant change.

Because the source files have not been compiled, the system does not benefit from a pre-Runtime compiler that may catch any source code errors. Therefore, the system may include parser 320. Parser 320 may parse through each of the updated source files stored in cache memory in order to determine whether the source files include any syntactic or semantic errors.

Class loader 322 may be invoked upon completion of the parsing. Class loader 322 may construct a binary instance (shown at 324) for each file that has been parsed successfully —i.e., that does not contain semantic or syntactic errors. A reference to each binary instance that has been successfully constructed may be stored in HashMap 328. The reference may be stored as a value in HashMap 328. The file name of the binary instance may be stored as a key in HashMap 328. Each pair included in HashMap 328 may include a key (a file name) and a value (a reference to a successfully constructed class instance).

Failed instances may include class instances that could not be constructed because of one or more errors. Failed instances may be included in failed instances container 326. In some embodiments, a developer may review the failed instances to determine and remediate the one or more errors. In other embodiments, the failed instances may attempt reloading (shown at 314). In these instances, when a class instance construction fails more than a predetermined amount of times, an indication of the failure may be transmitted to a developer for review and remediation. The developer may resolve the failure by altering the source code included in the business rules source tree 302.

HashMap 328 and runtime executor 330, included in production runtime container 332, may communicate at Runtime, shown at boundary 338. Runtime executor 330 may run a specific execution for an entity or customer. Runtime executor 330 may be a static code element. Software code may be executed from production runtime container 332. At least a portion of the software code may be received from compiled binaries 336, via communication 21.

The software code may identify one or more keys. The one or more keys may be transmitted to HashMap 328, via communication 15. The one or more keys may be included in HashMap 328. HashMap 328 may identify the value or values corresponding to the received one or more keys. The value or values corresponding to the received key(s) may be an updated reference. The updated reference may reference a storage location that includes updated logic specific to the entity or customer. The updated reference may be transmitted to runtime executor 330. Communications 15 and 16 may enable updating software logic to new software logic without additional effort or changes by Runtime executor 330, container 332 and/or compiled binaries 336.

In the event that the value retrieval and/or class instance retrieval is unsuccessful, an error handling module may be invoked. The error handling module may, in some instances, attempt a rerun of the process.

In other instances, other error handling methods may be used. These methods may include utilizing default keys, referencing default methods and/or transmitting error messages to one or more clients and/or developers.

Upon receipt of the reference to the updated logic, production runtime container 332 may communicate, via communication line 19, with functional features 334, shown at 20. Functional features 20 may be actual storage of the referenced class instance. There may be a distinct functional feature for each value.

Thus, apparatus and methods for a blended virtual machine approach for flexible production delivery of intelligent business workflow rules are provided. Persons skilled in the art will appreciate that the present invention can be practiced by other than the described embodiments, which are presented for purposes of illustration rather than of limitation. The present invention is limited only by the claims that follow.

What is claimed is:

1. A system for blending uncompiled source files with compiled binaries in a Runtime container, said uncompiled source files received at a greater than threshold frequency, said compiled binaries received at a lower than threshold frequency, the system comprising:
   a hardware processor to execute operations of the system;
   a configuration database comprising data relating to a scheduler and a mount point;
      the mount point, said mount point being a storage location of a business rules source tree, said business rules source tree comprising content source files and logic source files;
   a cryptographic hash function module, wherein the cryptographic hash function module is resident on the hardware processor;
   a parser;
   a cache memory;
   a class loader;
   a HashMap;
   a Runtime executor; and
   a Runtime container;
   wherein:
      the scheduler is invoked by the configuration database;
      the scheduler determines if a current time is a refresh time, the refresh time being established after a predetermined time period has elapsed from a previous refresh time;
      the cryptographic hash function module executes a cryptographic hash function on each content source file and logic source file included in a business rules source tree;
      the cryptographic hash function module generates a hash digest for each content source file and logic source file;

the cryptographic hash function module compares, for each content source file and logic source file, the generated hash digest to a stored hash digest;

for each content source file in which the generated hash digest does not match the stored hash digest, the cryptographic hash function module copies the content source file from the mount point into the cache memory;

for each logic source file in which the generated hash digest does not match the stored hash digest, the cryptographic hash function module copies the logic source file from the mount point into the cache memory;

the parser examines the copied source files for semantic and syntactic error;

the parser identifies the copied source files that are free of semantic and syntactic errors;

the parser invokes the class loader in response to the parser identifying copied source files that are free of semantic and syntactic errors;

the class loader creates a class instance for each identified loaded source file;

the class instance is ingestible by the Runtime container;

the HashMap stores:
- a relationship of each created class instance and a corresponding name of the identified loaded source file;
- a reference to a location of the class instance;
- each name of each identified loaded source file is included in the HashMap as a key;
- each reference to each location of the class instance is included in the HashMap as a value;

the Runtime executor receives a file name with which to load a corresponding class;

the Runtime executor transmits the file name to the HashMap;

the Runtime executor retrieves a corresponding reference location;

the Runtime container retrieves the corresponding class for the reference location;

the Runtime container receives the compiled binaries; and the Runtime container processes the compiled binaries with the retrieved corresponding class.

2. The system of claim 1, wherein the compiled binaries reference a file name.

3. The system of claim 2, wherein the file name corresponds to a business rule.

4. The system of claim 3, wherein the Runtime container interpolates the retrieved class, that corresponds to the business rule, into the compiled binaries.

5. The system of claim 1, wherein the Runtime container receives a plurality of file names with which to load corresponding classes.

6. A system for blending uncompiled source files, received at a greater than threshold frequency, with compiled binaries, received at a lower than threshold frequency, in a Runtime container, the system comprising:
- a hardware processor to execute operations of the system;
- a configuration database, said configuration database comprising data relating to a scheduler and a mount point;
- the scheduler, said scheduler being invoked by the configuration database, said scheduler determining if a current time is a refresh time, said refresh time being established after a predetermined time has elapsed from a previous refresh time;
- the mount point, said mount point being a storage location of a business rules source tree, said business rules source tree comprising content source files and logic source files;
- a cryptographic hash function module, wherein the cryptographic hash function module is resident on the hardware processor, operable to:
    - execute a cryptographic hash function on each content source file and logic source file included in the business rules source tree;
    - generate a hash digest for each content source file and logic source file included in the business rules source tree;
    - for each content source file and logic source file, compare the generated hash digest to a stored hash digest; and
    - for each content source file and logic source file in which the generated hash digest does not match the stored hash digest, load the file from the mount point to a cache memory;
- a parser, said parser examining the loaded source files for semantic and syntactic errors, said parser identifying the one or more loaded source files that are free of semantic and syntactic errors;
- a class loader, said class loader being invoked, said class loader creating a class instance for each identified loaded source file, said class instance being ingestible by the Runtime container;
- a HashMap, said HashMap storing a relationship of each class instance and a name of the identified loaded source file, wherein each reference to each location of each class instance is included as a value in the HashMap and each name of each identified loaded source file is included as a key in the HashMap;
- a Runtime executor located within the Runtime Container, said Runtime executor being operable to:
    - receive a file name with which to load a corresponding class;
    - transmit the file name to the HashMap; and
    - retrieve a corresponding reference location;
- the Runtime container operable to:
    - retrieve the corresponding class for the reference location;
    - receive the compiled binaries; and
    - process the compiled binaries with the retrieved corresponding class.

7. The system of claim 6, wherein the compiled binaries reference a file name.

8. The system of claim 7, wherein the file name corresponds to a business rule.

9. The system of claim 8, wherein the Runtime container interpolates the retrieved class, that corresponds to the business rule, into the compiled binaries.

10. The system of claim 6, wherein the Runtime container receives a plurality of file names, with which to load corresponding classes.

11. A computer implemented method, using at least a hardware processor, for blending source files, received at greater than threshold frequency, with compiled binaries, received at lower than threshold frequency, in a single Runtime container, the computer implemented method comprising:
- receiving, at a configuration database, data relating to configured elements, the configured elements comprising a scheduler and a mount point;

invoking the scheduler;

determining whether a current time is a predetermined refresh time;

identifying the mount point, said mount point being a storage location;

performing, using at least the hardware processor, a cryptographic hash digest of the storage location, said storage location comprising business rule content, business rule logic and file structure;

determining whether one or more hash signatures includes in the cryptographic hash digest have changed since the last cryptographic hash digest;

retrieving, by a source loader, source files, said source files comprising business rule content and business rule logic;

storing an in-memory equivalent of the source files;

parsing the source files, said parsing comprising examining the source files for semantic and syntactic errors;

invoking a class loader for each of the source files that have been parsed successfully;

storing, in a HashMap comprising keys and values, a name of each successful file as a key and a reference to the corresponding class instance as a value;

receiving a first key;

using the HashMap to determine the reference associated with the first key;

loading the referenced class instance;

combining the source files with the loaded class instance; and executing the source files combined with the class instance.

12. The computer implemented method of claim 11, wherein the source files include a second key.

13. The computer implemented method of claim 12, wherein the file corresponds to a file name.

14. The computer implemented method of claim 13, wherein the file name corresponds to a business rule.

15. The computer implemented method of claim 14, further comprising interpolating the loaded class instance, that corresponds to the business rule, into the source files, at each location that includes the key.

16. The computer implemented method of claim 11, further comprising receiving plurality of keys, with which to load corresponding classes.

* * * * *